United States Patent [19]
Akutsu et al.

[11] Patent Number: 6,078,467
[45] Date of Patent: Jun. 20, 2000

[54] MAGNETIC RECORDING APPARATUS HAVING MEDIUM DRIVING MOTOR WITH REDUCED THICKNESS UTILIZING PRESS WORKING, PRESS FORMING OR THE LIKE

[75] Inventors: Satoru Akutsu; Hitoshi Tamayama; Hirofumi Ouchi; Yuji Nakahara; Nobuaki Miyake, all of Tokyo, Japan

[73] Assignee: Mitsubishi Denki Kabushiki Kaisha, Tokyo, Japan

[21] Appl. No.: 09/069,157

[22] Filed: Apr. 29, 1998

[30] Foreign Application Priority Data

Sep. 29, 1997 [JP] Japan .................................. 9-263064

[51] Int. Cl.⁷ .................................................. G11B 17/02
[52] U.S. Cl. ..................... 360/99.08; 369/266; 360/99.04
[58] Field of Search .............................. 360/98.07, 99.04, 360/99.08; 369/266; 310/216, 217, 254, 258, 67 R

[56] References Cited

U.S. PATENT DOCUMENTS

| | | | |
|---|---|---|---|
| 5,124,863 | 6/1992 | Koizumi et al. ..................... 360/99.08 |
| 5,859,486 | 1/1999 | Nakahara et al. ....................... 310/254 |
| 5,870,248 | 2/1999 | Akutsu et al. ......................... 360/99.04 |
| 5,930,076 | 7/1999 | Morita ................................... 360/99.08 |

FOREIGN PATENT DOCUMENTS

| | | |
|---|---|---|
| 5-176485 | 7/1993 | Japan . |
| 6-237548 | 8/1994 | Japan . |
| 8-19196 | 1/1996 | Japan . |
| 9-19095 | 1/1997 | Japan . |

*Primary Examiner*—William R. Korzuch

[57] ABSTRACT

A radial gap type medium driving motor for rotating a recording medium has first coil units having first windings of a first number of layers and second coil units having second windings of a second number of layers that is larger than the first number of layers. The first and second coil units are formed by winding wire on tooth-like poles of tooth-like pole blocks of a stator. A frame provided with a bearing portion for rotatably supporting the medium driving motor has a first accommodating portion for accommodating the first coil units and second accommodating portions for accommodating the second coil units.

14 Claims, 7 Drawing Sheets

MAGNETIC RECORDING APPARATUS HAVING MEDIUM DRIVING MOTOR WITH REDUCED THICKNESS UTILIZING PRESS WORKING, PRESS FORMING OR THE LIKE

BACKGROUND OF THE INVENTION

1. Field of the Invention

The present invention relates to a magnetic recording apparatus having an improved structure of a motor and a motor frame, and more specifically, relates to a thin magnetic recording apparatus in which the heights of the motor and the frame are reduced.

2. Background of the Invention

FIG. 7 is an exploded perspective view of a conventional magnetic recording apparatus disclosed in Japanese Patent Laid-Open No. 6-220586. FIG. 8 illustrates a motor accommodation state as viewed from point A in FIG. 7. These figures depict a magnetic recording apparatus, generally indicated by reference numeral 66, including a carriage mechanism 55, a medium driving motor 63, a control circuit board 64, and a frame 65.

A carriage mechanism 55 includes components 50 to 54. Reference numerals 50 and 51 denote magnetic heads. An arm 52 supports the magnetic head 50. A carriage 53 that supports the magnetic head 51 also supports the arm 52 swingably at one end. A stepping motor 54 step-moves the carriage 53 in the radial direction of a recording medium (not shown).

The medium driving motor 63 includes components 56 to 62. A stator 56 has coils 56a each of which is formed by winding a wire on a tooth-like pole in three layers. A rotor 57 is disposed such that a rotor magnet 57a is opposed to the tooth-like poles of the stator 56. A hub portion 58 that is provided in the rotor 57 holds the recording medium. Reference numeral 59 denotes a rotary shaft provided in the rotor 57, and numeral 60 denotes a bearing of the rotary shaft 59. A bearing fixing portion 61 is formed on a frame (described later). Reference numeral 62 denotes a stator cover.

Reference numeral 64 denotes a control circuit board for controlling operations of the carriage mechanism 55 and the medium driving motor 63.

Reference numeral 65 denotes a frame in which the carriage mechanism 55 and the medium driving motor 63 are fixed or accommodated. Reference symbol 65a denotes a bottom plate and symbol 65b denotes a coil accommodating portion 65b. Predetermined portions of the coil accommodating portion 65b are pressed by press working to reduce the thickness of the frame 65 there. Reference symbol 65c denotes strain escape holes for escape of the pressed portions.

Referring to FIG. 8, character B represents an interval between the bottom surface of the frame 65 and the top surface of the stator cover 62, i.e., the thickness of the magnetic recording apparatus 66. Character C represents the thickness of the frame 65 and character D represents a level difference formed through pressing by press working.

In the conventional magnetic recording apparatus 66 having the above-described structure, the coils 56a are partially accommodated in the coil accommodating portion 65b to reduce the height of the magnetic recording apparatus 66, i.e., to make it thinner. However, the reduction in dimension resulting from press working has a certain limit, and hence it is almost impossible to further reduce the thickness of the apparatus 66 by partially thinning the frame 65.

Similarly, even with such forming techniques as aluminum die casting, rather than press working, it is almost impossible to further reduce the thickness of the apparatus 66.

On the other hand, forming holes in the frame 65 at the positions confronting the coils 56a and accommodating the coils 56a there may absorb part of the height of the coils 56a. However, this structure has a problem in that the rigidity of the apparatus becomes insufficient because a large number of holes having large dimensions need to be formed in the frame 65.

SUMMARY OF THE INVENTION

The present invention has been made to solve the above-described problems. A first object of the present invention is to provide a thin magnetic recording apparatus by more effectively utilizing the technique of thinning a frame by press working, forming, or the like. A second object of the invention is to provide a thin magnetic recording apparatus in which the strain in a frame is reduced and its rigidity is secured.

To achieve the above objects, the present invention provides a magnetic recording apparatus comprising a magnetic head for accessing a disk-shaped recording medium and a carriage mechanism for moving the magnetic head in the radial direction of the recording medium. A radial gap type medium driving motor is provided which has a hub portion for holding and rotating the recording medium. The medium driving motor had a stator and a rotor. The rotor has a first coil unit having a first winding that is formed by winding a wire on tooth-like poles in a first number of layers. The rotor has a second coil unit having a second winding that is formed by winding a wire on tooth-like poles in a second number of layers that is larger than the first number of layers. Further, a frame is provided which has a bearing portion for rotatably supporting the medium driving motor. The frame has a first accommodating portion for accommodating the first coil unit and a second accommodating portion for accommodating the second coil unit.

In the magnetic recording apparatus, the medium driving motor may further have, on the side of the hub portion, a stator cover for covering the stator. The stator cover may have a cover-side accommodating portion, for instance a through-hole, for accommodating the second coil unit.

In the frame, the first accommodating portion may be formed by reducing the thickness of a bottom plate of the frame in a region confronting the stator.

In the frame, the second accommodating portion may be formed by reducing the thickness of a bottom plate of the frame in a region confronting the second coil unit.

In the frame, the second accommodating portion may be formed by forming a through-hole in a bottom plate of the frame in a region confronting the second coil unit.

The stator of the medium driving motor may have a plurality of tooth-like pole blocks and connecting portions for connecting the plurality of tooth-like pole blocks and approximately assume a shape of a character C or U. In the stator, first coil units and second coil units may be alternately provided with a plurality of tooth-like pole blocks.

The medium driving motor may be a three-phase motor, and each of the plurality of tooth-like pole blocks may have three tooth-like poles each being wound with one of a u-phase coil, a v-phase coil, and a w-phase coil of the first or second coil units.

The ratio of the first number of layers to the second number of layers may be 2:3, 1:2 or 1:3.

Other and further objects, features and advantages of the invention will appear more fully from the following description.

DETAILED DESCRIPTION OF THE INVENTION

Figure 1:
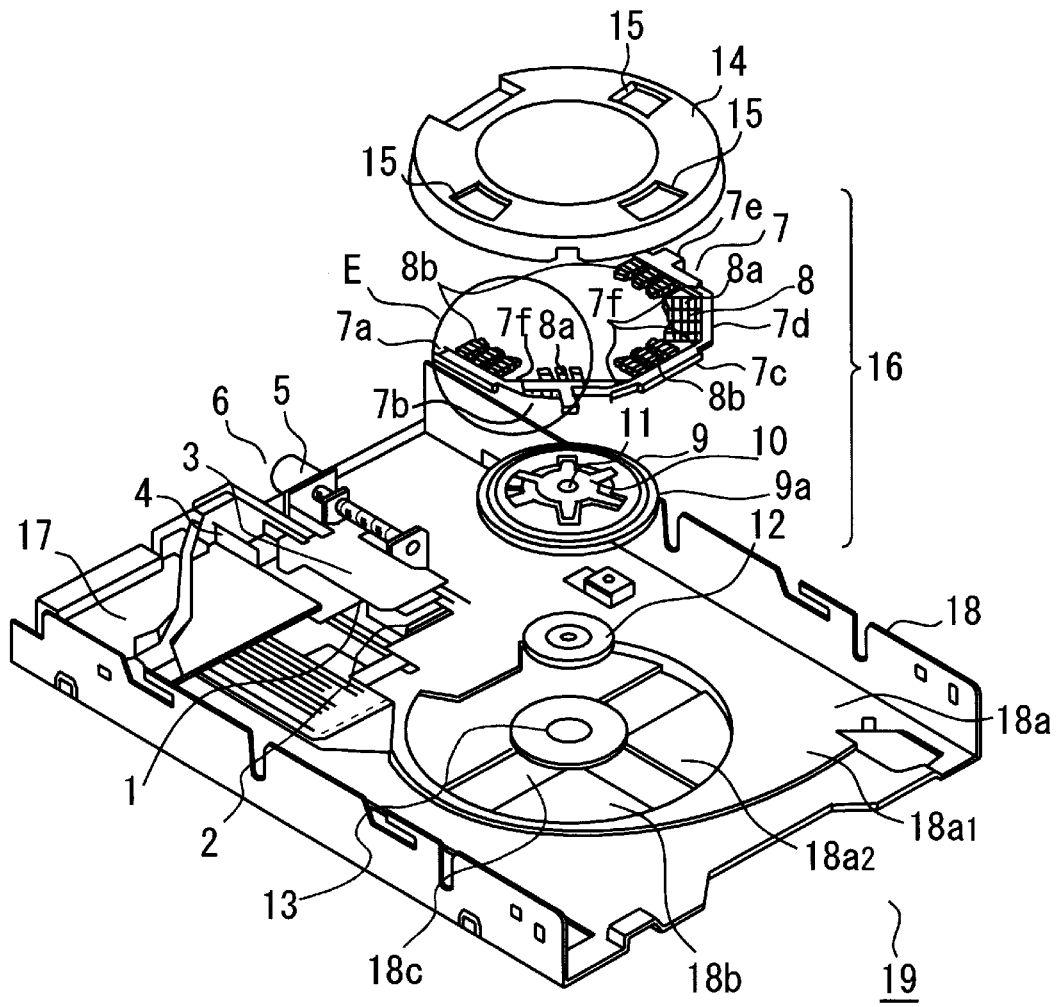
FIG. 1 is an exploded perspective view of a magnetic recording apparatus according to a first embodiment of the present invention.

This invention will be described in further detail by way of examples with reference to the accompanying drawings, in which like reference numerals designate same or corresponding parts.

First Embodiment

Figure 2:
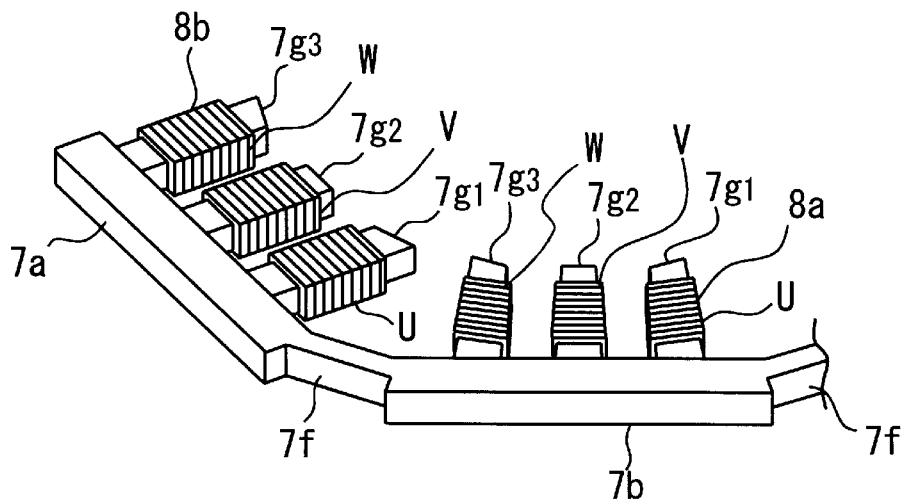
FIG. 2 is an enlarged view of part E in FIG. 1.
Figure 3:
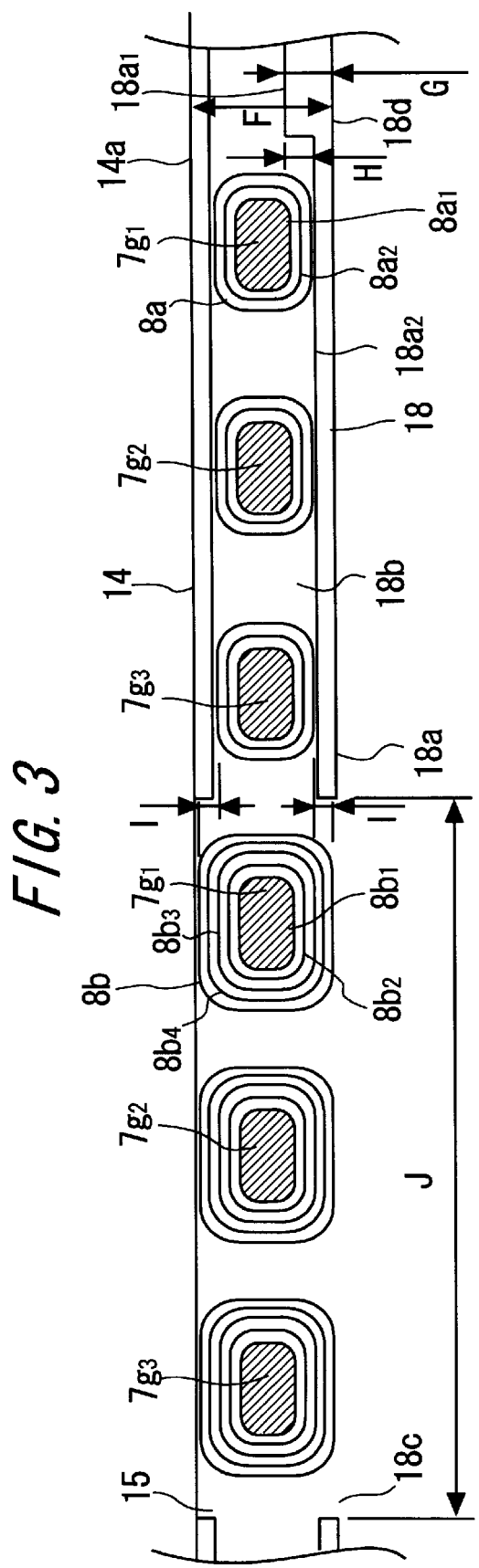
FIG. 3 illustrates an accommodation state of coil units in the first embodiment of the present invention.

A first embodiment of the present invention will be hereinafter described. FIG. 1 is an exploded perspective view of a magnetic recording apparatus according to a first embodiment of the present invention. FIG. 2 is an enlarged view of part E in FIG. 1. FIG. 3 illustrates an accommodation state of coil units.

FIGS. 1 and 2 depict a magnetic recording apparatus, generally indicated by reference numeral 19, including a carriage mechanism 6, a medium driving motor 16, a control circuit board 17, and a frame 18.

In FIG. 1, a carriage mechanism 6 includes components 1 to 5. Reference numerals 1 and 2 denote magnetic heads that magnetically record or reproduce information onto or from a disk-shaped recording medium (not shown) by accessing it. An arm 3 supports the magnetic head 1. A carriage 4 supports the magnetic head 2 and also supports the arm 3 swingably at one end. A stepping motor 5 step-moves the carriage 4 in the radial direction of the recording medium.

A stator 7 made of a magnetic material has tooth-like pole blocks 7a–7e and connecting portions 7f, and is shaped so as to assume a curved form like a character C or U. The bottom portion of the stator 7 is fixed to a frame 18 (described later). As shown in FIG. 2, each of the tooth-like pole blocks 7a–7e has tooth-like poles 7g1–7g3 that project from one side face of the tooth-like pole block by a predetermined length. Each connecting portion 7f mechanically connects adjacent tooth-like pole blocks.

In FIGS. 1 and 2, coil units 8 include first coil units 8a and second coil units 8b in which a wire is wound by a larger number of turns than in the first coil units 8a. The wire is a copper wire of 0.2–0.3 mm in diameter.

Referring to FIGS. 2 and 3, the first coil units 8a of the coil units 8 are composed of two kinds of winding layers, i.e., first winding layers 8a1 and second winding layers 8a2. The first winding layers 8a1 are such that a copper wire of 0.2–0.3 mm in diameter is wound by n turns on the respective tooth-like poles 7g1–7g3 of the tooth-like pole blocks 7b and 7d. The second winding layers 8a2 are such that the copper wire is wound by n−1 turns on the respective first winding layers 8a1.

The second coil units 8b of the coil units 8 are composed of four kinds of winding layers, i.e., first to fourth winding layers 8b1–8b4. The first winding layers 8b1 are such that a copper wire of 0.2–0.3 mm in diameter is wound by n turns on the respective tooth-like poles 7g1–7g3 of the tooth-like pole blocks 7a, 7c, 7e. The second winding layers 8b2 are such that the copper wire is wound by n−1 turns on the respective first winding layers 8g1. The third winding layers 8b3 are such that the copper wire is wound by n−2 turns on the respective second winding layers 8b2. The fourth winding layers such that the wire is wound by n−3 turns on the respective third winding layers 8b3.

Each of the first coil units 8a and the second coil units 8b of the coil units 8 is 3-phase coils consisting of a u-phase coil u that is wound on the right-hand tooth-like pole 7g1 of each of the tooth-like pole blocks 7a–7e, a v-phase coil v that is wound on the central tooth-like pole 7g2, and a w-phase coil w that is wound on the left-hand pole 7g3. As shown in FIG. 1, the first and second coil units 8a and 8b are alternately provided for the tooth-like pole blocks 7a–7e.

As shown in FIG. 1, a rotor 9 is disposed such that a rotor magnet 9a having alternately magnetized S poles and N poles is opposed to the tooth-like poles 7g1–7g3 with a predetermined interval.

A hub portion 10 provided in the rotor 9 holds the recording medium (not shown). Reference numeral 11 denotes a rotary shaft provided in the rotor 10, and numeral 12 denotes a bearing of the rotary shaft 11. A bearing fixing portion 13 is formed on a frame 18 (described later).

A stator cover 14 is formed so as to be curved approximately in the same manner as the stator 7 and disposed over the stator 7 so as to cover it. The stator cover 14 is fixed to the frame 18 (described later). Rectangular holes as cover-side accommodating portions 15 are formed in the stator cover 14 at positions confronting the respective tooth-like pole blocks 7a, 7c, and 7e on which the second coil units 8b are wound so that each rectangular hole has an area approximately equal to the area occupied by each of the tooth-like pole blocks 7a, 7b, and 7c.

In the medium driving motor 16, a gap exists between the rotor magnet 9a of the rotor 9 and the tooth-like poles 7g1–7g3 of the stator 7 in the radial direction originating from the rotary shaft 11. This type of driving motor is generically called a radial gap type driving motor.

A control circuit board 17 controls operations of the carriage mechanism 6 and the medium driving motor 16.

Reference numeral 18 denotes the above-mentioned frame to or in which the carriage mechanism 6 and the medium driving motor 16 are fixed or accommodated. Reference symbol 18a denotes a bottom plate of the frame 18, and symbols 18a1 and 18a2 denote first and second surfaces of the bottom plate 18a, respectively. A first accommodating portion 18b provided in the bottom plate 18a accommodates the portions of the coil units 8 that are wound on the stator 7 and that confront the frame 18. The first accommodating portion 18b is formed by providing a level difference between the first surface 18a1 and the second surface 18a2 by thinning the bottom plate 18a of the frame by about 0.5 mm in an annular region that extends from a position 10 mm distant from the center of the bearing fixing portion 13 in the radial direction to a position 30 mm distant from the center.

The first accommodating portion 18b may be formed by crushing the bottom plate 18a by press working so as to partially thin it or by making a thin portion by die casting or the like.

Rectangular through-holes as second accommodating portions 18c are formed in the bottom plate 18a at positions confronting the respective tooth-like pole blocks 7a, 7c, and 7e on which the second coil units 8b are wound so that each rectangular through-hole has an area approximately equal to the area occupied by the tooth-like pole blocks 7a, 7b, or 7c.

Although in the first embodiment the rectangular through-holes as the second accommodating portions 18c are formed in the frame 18 so that each rectangular through-hole has an area approximately equal to the area occupied by the tooth-like pole blocks 7a, 7c, or 7e, rectangular through-holes may be formed in the frame 18 so that each rectangular through-hole has an area approximately equal to the area occupied by the three second coil units 8b. In the latter case, three rectangular through-holes may be formed separately for the u-phase u, v-phase v, and w-phase w coils of the second coil units 8b wound on the tooth-like poles 7g1–7g3, respectively.

Figure 8:
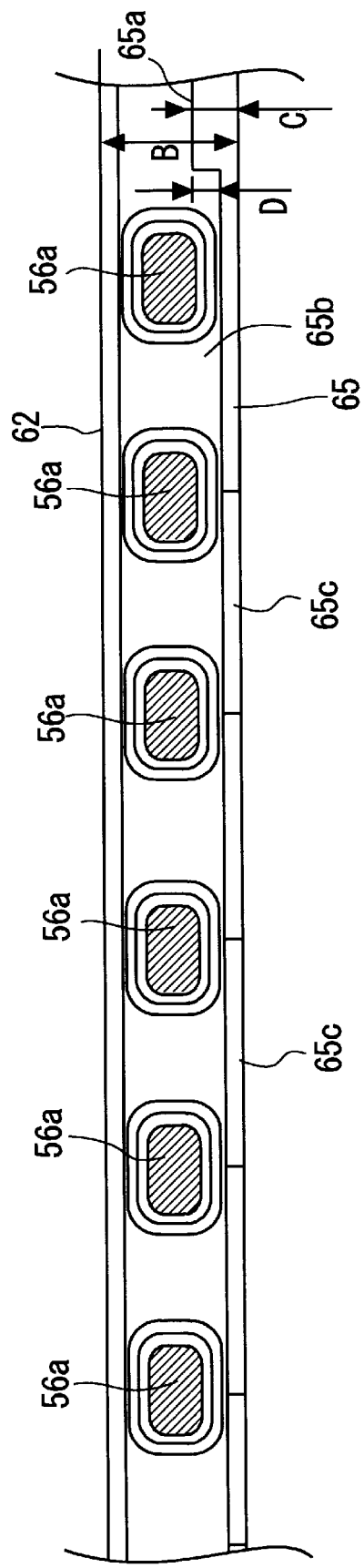
FIG. 8 illustrates a motor accommodation state as viewed from point A in FIG. 8.

Referring to FIG. 3, character F represents an interval between an external bottom surface 18d of the frame 18 and a front surface 14a of the stator cover 14, i.e., the thickness of the magnetic recording apparatus 19. A relationship F<B (B as shown in FIG. 8) holds. Character G represents the thickness of the bottom plate 18a and character H represents a level difference between the first surface 18a1 and the second surface 18a2. In the first embodiment, the thickness G is equal to 1.0 mm and the level difference H is equal to 0.5 mm. Relationships G=C (C as shown in FIG. 8) and H=D (D as shown in FIG. 8) hold.

Character I represents a difference in dimension between the first coil units 8a and the second coil units 8b due to the difference in the number of winding layers. To ensure stable winding of a copper wire, copper wires of an upper layer are wound at recesses between adjacent copper wires of a lower layer, to cause a certain overlap between the upper and lower layers. If it is assumed that the diameter of the copper wire is 0.3 mm, for instance, the level difference I is about 0.5 mm rather than 0.6 mm. Character J represents the length of one sideline of one of the rectangular through-holes as the second accommodating portions 18c.

As shown in FIG. 3, the first coil units 8a that are relatively thin in the height direction because of the copper wire winding of only two layers are accommodated in the first accommodating portion 18b. Further, to compensate for insufficient torque of the first coil units 8a, the third winding layers 8b3 and the fourth winding layers 8b4, on the side of the bottom plate 18a, of the second coil units 8b having the copper wire winding of four layers are inserted in the respective second accommodating portions 18c while the third winding layers 8b3 and the fourth winding layers 8b4, on the side of the stator cover 14, of the second coil units 8b are accommodated in the respective cover-side accommodating portions 15. Therefore, the thickness of the apparatus 19 can be reduced by the difference in the number of layers. That is, the interval F between the external bottom surface 18d of the frame 18 and the top surface 14a of the stator cover 14 can be made smaller than the corresponding interval B of the conventional apparatus 66 by approximately the thickness of the third winding layer 8b3 plus the fourth winding layer 8b4, and the magnetic recording apparatus 19 can be thinned as much.

Where the coil units 8 are formed by using a 0.3-mm-diameter copper wire, for instance, the level difference I is about 0.5 mm as described above. Since this level difference contributes to the thinning of the magnetic recording apparatus 19, the apparatus 19 can be thinned by about 0.5 mm.

Although the first embodiment has been described above from the viewpoint that it enables thinning of the magnetic recording apparatus 19, it is possible to evaluate the first embodiment from the viewpoint that it increases the torque of the medium driving motor 16 without changing the thickness of the apparatus.

Assume a case where originally each of the first and second coil units 8a and 8b has a copper wire winding of two layers. To increase the torque, the number of turns may be increased by forming each of the second coil units 8b by a winding of four layers and having the third winding layers 8b3 and the fourth winding layers 8b4 accommodated in the cover-side accommodating portions 15 and the second accommodating portions 18c. It is understood that an advantage can be obtained when a more powerful medium driving motor 16 can be provided without changing the thickness of the apparatus.

Although in the first embodiment the ratio of the number of layers of each first coil unit 8a to that of each second coil unit 8b is set at 1:2, the invention is not limited to such a case. The ratio may be set at 2:3. For example, FIG. 4 illustrates another mode of setting the ratio in the number of layers in the coil units 8.

Figure 4:
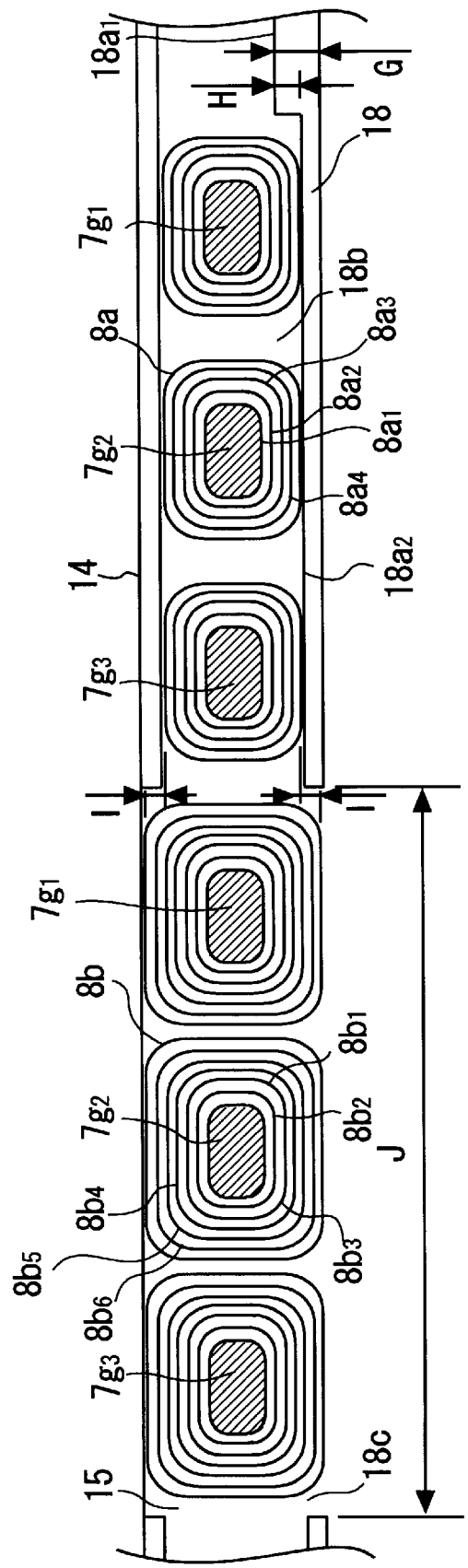
FIG. 4 illustrates another mode of setting the ratio in the number of layers in the coil units.

The components in FIG. 4 having the same reference symbols as in FIG. 3 are the same as or equivalent to the corresponding components in FIG. 3 and descriptions thereof will be omitted. Reference symbol 8a3 denotes a third winding layer formed by winding a copper wire on the second winding layer 8a2 by n−2 turns, and symbol 8a4 denotes a fourth winding layer formed by winding a copper wire on the third winding layer 8a3 by n−2 turns. Reference symbol 8b5 denotes a fifth winding layer formed by winding a copper wire on the fourth winding layer 8b4 by n−3 turns, and symbol 8b6 denotes a sixth winding layer formed by winding a copper wire on the fifth winding layer 8b5 by n−5 turns. The coil units 8 shown in FIG. 4 thus include the first coil units 8a each having a winding of four layers and the second coil units 8b each having a winding of six layers. In this manner, the apparatus 19 can be made thinner even with another ratio in the number of layers. On the other hand, the torque of the medium driving motor 16 can be increased by increasing the number of layers.

Second Embodiment

Figure 5:
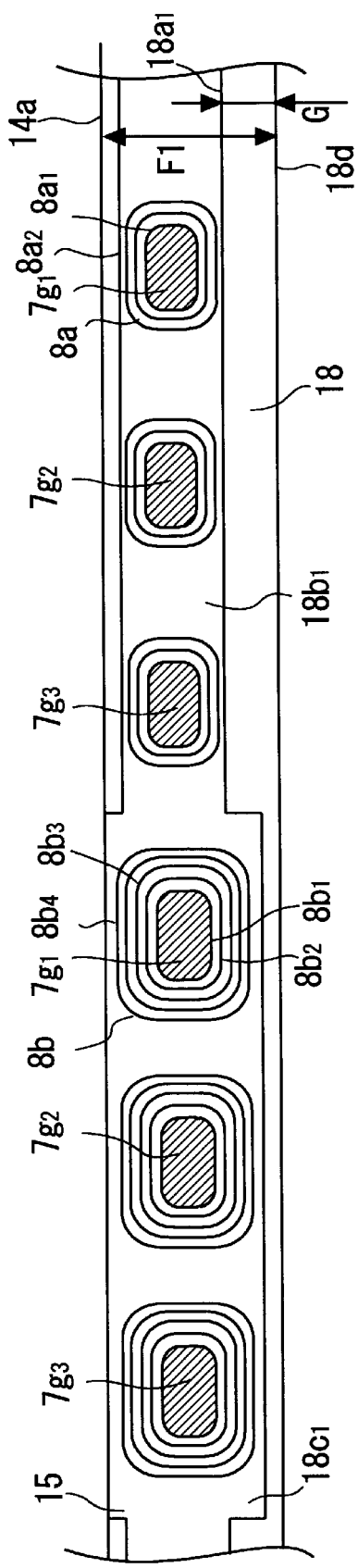
FIG. 5 illustrates an accommodation state of coil units in a second embodiment of the present invention.

A second embodiment of the present invention will be hereinafter described. The second embodiment is directed to a mode of a frame that is high in rigidity. FIG. 5 illustrates an accommodation state of coil units in the second embodiment.

The components in FIG. 5 having the same reference symbols as in FIG. 3 are the same as or equivalent to the corresponding components in FIG. 3 and descriptions thereof will be omitted. A first accommodating portion 18b1 is formed on the first surface 18a1 and accommodates the stator 7.

Second accommodating portions 18c1 accommodate the portions, confronting the frame 18, of the second coil units 8b of the coil units 8 that are wound on the tooth-like poles 7g1–7g3 of the tooth-like pole blocks 7a, 7c, and 7e of the stator 7. The second accommodating portions 18c1 are formed by providing a level difference between the first surface 18a1 and the second surface 18a2 by thinning the bottom plate 18a of the frame by about 0.5 mm in regions that extend in the radial direction originating from the center of the bearing fixing portion 13 from a position 10 mm distant from the center and confront the respective tooth-like pole blocks 7a, 7c, and 7e or the second soil units 8b.

Symbol F1 represents an interval between the external bottom surface 18d and the front surface 14a of the stator cover 14, i.e., the thickness of the magnetic recording apparatus 19. A relationship F1>F holds (see FIG. 3).

As shown in FIG. 5, the first coil units 8a having the copper wire winding of two layers are disposed above the first surface 18a1. Further, the portions, on the side of the bottom plate 18a, of the second coil units 8b having the copper wire winding of four layers are accommodated in the respective second accommodating portions 18c1. The third winding layers 8b3 and the fourth winding layers 8b4, on the side of the stator cover 14, of the second coil units 8b are accommodated in the respective cover-side accommodating portions 15. Therefore, the interval F1 between the external bottom surface 18d of the frame 18 and the top surface 14a of the stator cover 14 can be made smaller than or equal to the corresponding interval B (see FIG. 8) of the conventional apparatus 66.

Further, in the second embodiment, it is not necessary to form, in the frame 18, the strain escape holes 65c or the coil accommodating portions 65b for accommodating the entire coils 56a as in the frame 65 of the conventional magnetic recording apparatus 66 shown in FIG. 8; that is, the proportion of the thin portions is smaller in the frame 18. Therefore, the rigidity of the frame 18 can be made relatively high.

In the second embodiment, if the difference in the number of layers between the first coil units 8a and the second coil units 8b is two and the diameter of the copper wire is 0.3 mm, the level difference I becomes 0.5 mm. Since the thickness G is set at 0.5 mm, the interval F1 is equal to the interval B. However, if the difference in the number of copper wire layers between the first coil units 8a and the second coil units 8b is increased, the magnetic recording apparatus 19 can be thinned by an amount corresponding to the increase of the difference in the number of layers.

In the magnetic recording apparatus 19 of the second embodiment, the first coil units 8a are disposed above the first accommodating portion 18b1 on the bottom plate 18a, and the portions, on the side of the bottom plate 18a, of the second coil units 8b are accommodated in the respective second accommodating portions 18c1. The third winding layers 8b3 and the fourth winding layers 8b4, on the side of the stator cover 14, of the second coil units 8b are accommodated in the respective cover-side accommodating portions 15. Therefore, the proportion of the thin portions of the frame 18 can be made small and the rigidity of the frame 18 can thereby be increased without increasing the thickness of the magnetic recording apparatus 19.

If the difference in the number of layers between the first coil units 8a and the second coil units 8b is increased, the magnetic recording apparatus 19 can be thinned by an amount corresponding to the increase of the difference in the number of layers.

It is noted that a selection between the mode of the frame 18 of the first embodiment having the first accommodating portion 18b and the second accommodating portions 18c and the mode of the frame 18 of the second embodiment having the first accommodating portion 18b1 and the second accommodating portions 18c1 may be made properly in accordance with the height, the rigidity, and other factors that are required for the magnetic recording apparatus 19.

Third Embodiment

Figure 6:
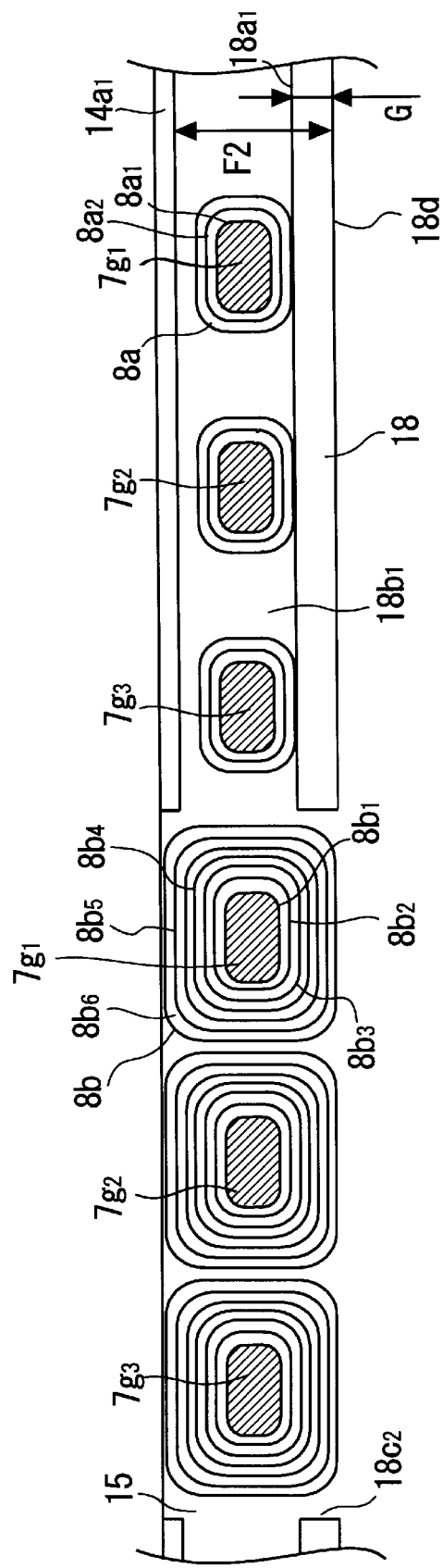
FIG. 6 illustrates an accommodation state of coil units in a third embodiment of the present invention.
Figure 7:
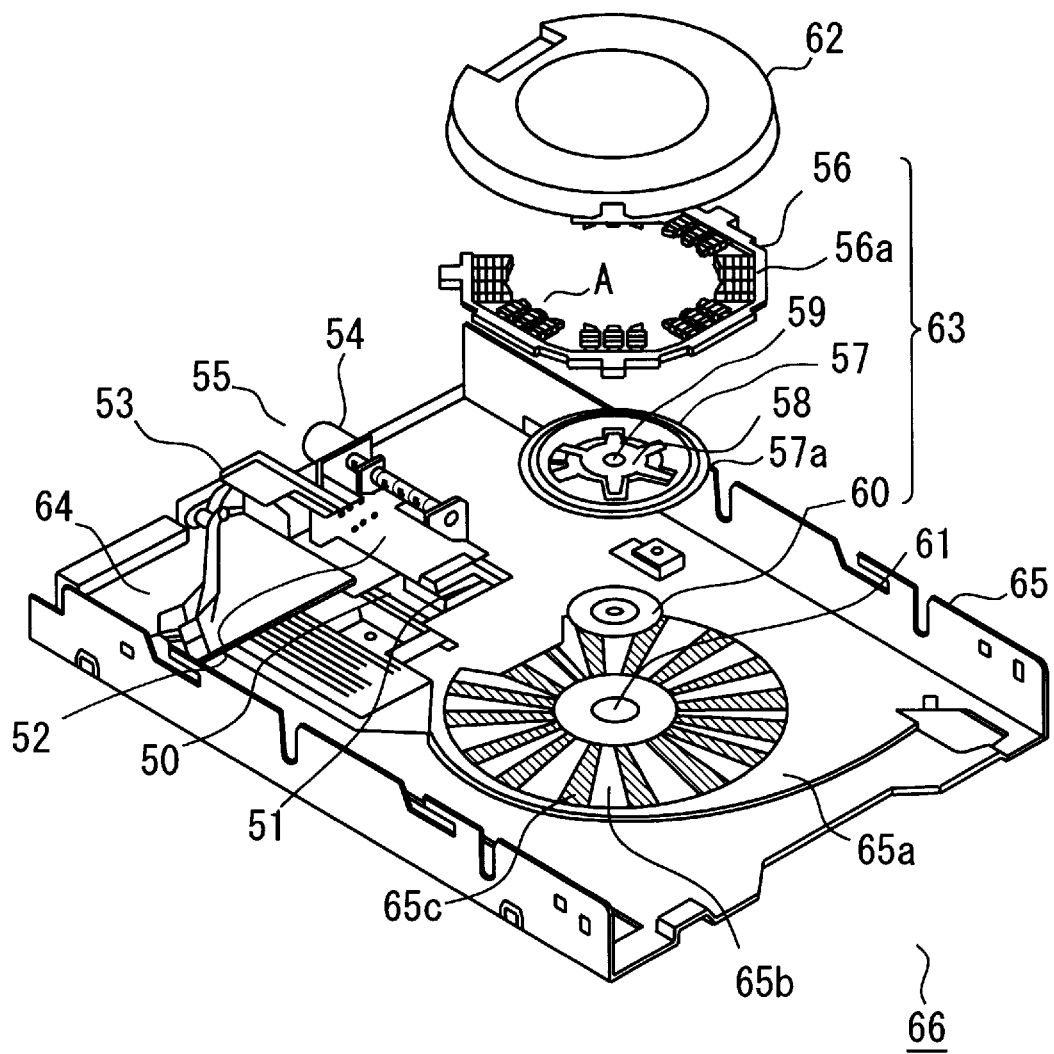
FIG. 7 is an exploded perspective view of a conventional magnetic recording apparatus.

A third embodiment of the present invention will be hereinafter described. The third embodiment is directed to a mode of a frame 18 that is simple in structure and capable of increasing the torque. FIG. 6 illustrates an accommodation state of coil units in the third embodiment.

The components in FIG. 6 having the same reference symbols as in FIGS. 3 or 5 are the same as or equivalent to the corresponding components in FIG. 3 or 5 and descriptions thereof will be omitted.

Second accommodating portions 18c2 are formed in the bottom plate 18a and accommodate the portions, confronting the frame 18, of the second coil units 8b of the coil units 8 that are wound on the tooth-like poles 7g1–7g3 of the tooth-like pole blocks 7a, 7c, and 7e (see FIG. 1) of the stator 7. The second accommodating portions 18c2 are rectangular through-holes that are formed in the bottom plate 18a of the frame at positions confronting the tooth-like pole blocks 7a, 7c, and 7e or the second coil units 8b so that each through-hole has an area approximately equal to the area occupied by the tooth-like pole block 7a, 7c, or 7e or the second coil units 8b.

Symbol F2 represents an interval between the external bottom surface 18d and the top surface 14a of the stator cover 14a1, i.e., the thickness of the magnetic recording apparatus 19. A relationship F2=F1 holds. (see F1 in FIG. 5).

As shown in FIG. 6, the ratio of the number of layers of the first coil units 8a to that of the second coil units 8b is set at 1:3.

As shown in FIG. 6, the first coil units 8a having the copper wire winding of two layers are accommodated in the first accommodating portion 18b1. Further, the portions, on the side of the bottom plate 18a, of the second coil units 8b having the copper wire winding of six layers are accommodated in the respective second accommodating portions 18c2. The portions, on the side of the stator cover 14, of the second coil units 8b are accommodated in the respective cover-side accommodating portions 15. Therefore, while the interval F2 between the external bottom surface 18d of the frame 18 and the top surface 14a of the stator cover 14 is equivalent to the interval F1 (see FIG. 5), the torque can be increased from the case of FIG. 5 because of the increased number of turns of the second coil units 8b.

Since the second accommodating portions 18c2 can be obtained by simply forming rectangular through-holes in the bottom plate 18a of the frame 18 at the positions confronting the second coil units 8b, the cost can be reduced.

The effects and advantages of the present invention may be summarized as follows.

As described above, the present invention provides a magnetic recording apparatus comprising a magnetic head for accessing a disk-shaped recording medium; a carriage mechanism for moving the magnetic head in the radial direction of the recording medium; a radial gap type medium driving motor having a hub portion for holding and rotating the recording medium, the medium driving motor further having a first coil unit having a first winding that is formed by winding a wire on a stator in a first number of layers and a second coil unit having a second winding that is formed by winding a wire on the stator in a second number of layers that is lager than the first number of layers; and a frame provided with a bearing portion for rotatably supporting the medium driving motor, the frame having a first accommodating portion for accommodating the first coil unit and a second accommodating portion for accommodating the portion of the second coil unit that corresponds to the part of the second number of layers exceeding the first number of layers. Therefore, the magnetic recording apparatus can be made thinner, or the torque of the medium driving motor can be increased while the thickness of the apparatus is kept the same.

In another aspect of the above magnetic recording apparatus, the medium driving motor may further have, on the side of the hub portion, a stator cover for covering the stator, and the stator cover may have a cover-side accommodating portion for accommodating the portion of the second coil unit that corresponds to the part of the second number of layers exceeding the first number of layers. Since the portion of the second coil unit corresponding to the exceeding part of its winding layers is accommodated in the cover-side accommodating portion, the magnetic recording apparatus can be made thinner, or the torque of the medium driving motor can be increased while the thickness of the apparatus is kept the same.

In another aspect, the first accommodating portion may be formed by reducing the thickness of a bottom plate of the frame in a region confronting the stator, and the second accommodating portion may be formed by forming a through-hole in the bottom plate in a region confronting the second coil unit. Since the portion of the second coil unit corresponding to the exceeding part of its winding layers is accommodated in the second accommodating portion, the magnetic recording apparatus can be made thinner, or the torque of the medium driving motor can be increased while the thickness of the apparatus is kept the same.

In another aspect, the second accommodating portion may be formed by reducing the thickness of a bottom plate of the frame in a region confronting the second coil unit. Since the portion of the second coil unit corresponding to the exceeding part of its winding layers is accommodated in the second accommodating portion, the magnetic recording apparatus can be made thinner, or the torque of the medium driving motor can be increased while the thickness of the apparatus is kept the same.

In another aspect, the second accommodating portion may be formed by forming a through-hole in a bottom plate of the frame in a region confronting the second coil unit. Since the portion of the second coil unit corresponding to the exceeding part of its winding layers is accommodated in the second accommodating portion, the magnetic recording apparatus can be made thinner, or the torque of the medium driving motor can be increased while the thickness of the apparatus is kept the same.

In another aspect, the stator of the medium driving motor may have a plurality of tooth-like pole blocks and connecting portions for connecting the plurality of tooth-like pole blocks and approximately assume a shape of a character C or U, and first coil units and second coil units may be alternately provided on the plurality of tooth-like pole blocks. Since the first coil units with a smaller number of turns and the second coil units with a larger number of turns are arranged alternately, the medium driving motor can rotate smoothly.

In another aspect, the medium driving motor may be a three-phase motor, and each of the plurality of tooth-like pole blocks may have three tooth-like poles each being wound with one of a u-phase coil, a v-phase coil, and a w-phase coil of the first or second coil units. Therefore, the medium driving motor can rotate smoothly.

In another aspect, the ratio of the first number of layers to the second number of layers may be 2:3. Therefore, the apparatus can be thinned by an amount corresponding to the difference in the number of layers.

In another aspect, the ratio of the first number of layers to the second number of layers may be 1:2. Therefore, the apparatus can be thinned by an amount corresponding to the difference in the number of layers, or the medium driving motor can rotate smoothly and provide increased torque while the thickness of the apparatus is kept the same.

In another aspect, the ratio of the first number of layers to the second number of layers may be 1:3. Therefore, the apparatus can be thinned by an amount corresponding to the difference in the number of layers, or the medium driving motor can rotate smoothly and provide increased torque while the thickness of the apparatus is kept the same.

Obviously many modifications and variations of the present invention are possible in the light of the above teachings. It is therefore to be understood that within the scope of the appended claims the invention may by practiced otherwise than as specifically described.

What is claimed is:

1. A magnetic recording apparatus comprising:
    a magnetic head for accessing a disk-shaped recording medium;
    a carriage mechanism for moving said magnetic head in a radial direction of said recording medium;
    a medium driving motor including a hub portion for holding and rotating said recording medium, said medium driving motor including a stator and a rotor,
    said stator including a first coil unit having a block of tooth shaped poles each wound with a first wire in a first number of layers, said stator further including a second coil unit having a block of tooth shaped poles each wound with a second wire in a second number of layers that is larger than said first number of layers; and
    a frame provided with a bearing portion for rotatably supporting said medium driving motor,
    said frame having a first accommodating portion for accommodating said first coil unit and a second accommodating portion for accommodating said second coil unit.

2. The magnetic recording apparatus according to claim 1, wherein said medium driving motor further includes a stator cover for covering said stator on the side of said hub portion, said stator cover having a through-hole for accommodating said second coil unit.

3. The magnetic recording apparatus according to claim 1, wherein said first accommodating portion of said frame is a reduced thickness of a bottom plate of said frame in a region confronting said first coil.

4. The magnetic recording apparatus according to claim 1, wherein said second accommodating portion of said frame is a reduced thickness of a bottom plate of said frame in a region confronting said second coil unit.

5. The magnetic recording apparatus according to claim 1, wherein said second accommodating portion of said frame is a through-hole in a bottom plate of said frame in a region confronting said second coil unit.

6. The magnetic recording apparatus according to claim 1, wherein said stator of said medium driving motor includes a plurality of tooth shaped pole blocks and a plurality of connecting portions for connecting said plurality of tooth shaped pole blocks, said stator approximately assuming one of a shape of a character C and U, and each of said first coil units and said second coil units are alternately formed with each of said plurality of tooth shaped pole blocks.

7. The magnetic recording apparatus according to claim 6, wherein said medium driving motor is a three phase motor, and each of said plurality of tooth shaped pole blocks has three tooth shaped poles, each being wound with one of a u-phase coil, a v-phase coil, and a w-phase coil of said first or said second coil units.

8. The magnetic recording apparatus according to claim 7, wherein a ratio of said first number of layers to said second number of layers is 2:3.

9. The magnetic recording apparatus according to claim 7, wherein a ratio of said first number of layers to said second number of layers is 1:2.

10. The magnetic recording apparatus according to claim 7, wherein a ratio of said first number of layers to said second number of layers is 1:3.

11. The magnetic recording apparatus according to claim 6, wherein a ratio of said first number of layers to said second number of layers is 2:3.

12. The magnetic recording apparatus according to claim 6, wherein a ratio of said first number of layers to said second number of layers is 1:2.

13. The magnetic recording apparatus according to claim 6, wherein a ratio of said first number of layers to said second number of layers is 1:3.

14. The magnetic recording apparatus according to claim 1, wherein said medium driving motor is a radial gap medium driving motor.

* * * * *